(12) United States Patent
Kruglick

(10) Patent No.: US 8,954,103 B2
(45) Date of Patent: Feb. 10, 2015

(54) MODEL BASED DOPPLER COMPENSATION USING TRAFFIC DATA

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 394 days.

(21) Appl. No.: 13/059,744

(22) PCT Filed: Oct. 1, 2010

(86) PCT No.: PCT/US2010/051182
§ 371 (c)(1),
(2), (4) Date: Feb. 18, 2011

(87) PCT Pub. No.: WO2012/044326
PCT Pub. Date: Apr. 5, 2012

(65) Prior Publication Data
US 2012/0083299 A1    Apr. 5, 2012

(51) Int. Cl.
| | | |
|---|---|---|
| *H04B 15/00* | (2006.01) | |
| *H04B 7/01* | (2006.01) | |
| *H04W 72/04* | (2009.01) | |

(52) U.S. Cl.
CPC ............... *H04B 7/01* (2013.01); *H04W 72/046* (2013.01)
USPC .......... 455/501; 455/556; 455/455; 455/63.1; 455/67.16; 455/522

(58) Field of Classification Search
CPC .................. H04W 72/0453; H04W 52/0206; H04W 72/0413; H04W 8/24; H04W 72/12; H04W 88/10; Y02B 60/50; G06F 1/266
USPC ................... 455/450–455, 63.11, 67.16, 522, 455/69–70, 556
See application file for complete search history.

(56) References Cited

U.S. PATENT DOCUMENTS

| | | | |
|---|---|---|---|
| 5,812,539 A | 9/1998 | Dent | |
| 6,008,758 A | 12/1999 | Campbell | |
| 7,012,973 B1 | 3/2006 | Piirainen | |
| 7,215,971 B2 | 5/2007 | Ormson | |
| 7,844,006 B2 | 11/2010 | Stojanovic | |
| 2005/0272379 A1* | 12/2005 | Rotta et al. | 455/67.16 |
| 2006/0039318 A1* | 2/2006 | Oh et al. | 370/328 |
| 2008/0101306 A1 | 5/2008 | Bertrand et al. | |
| 2008/0137062 A1* | 6/2008 | Holton et al. | 356/28 |
| 2008/0238762 A1* | 10/2008 | Gumas | 342/99 |
| 2010/0246528 A1* | 9/2010 | Huang | 370/330 |
| 2012/0083299 A1* | 4/2012 | Kruglick | 455/501 |

FOREIGN PATENT DOCUMENTS

| | | |
|---|---|---|
| JP | 11-509065 A | 8/1999 |
| JP | 2001-024576 A | 1/2001 |

(Continued)

OTHER PUBLICATIONS

Cavalcanti, D. et al., "Connectivity Opportunity Selection in Heterogeneous Wireless Multi-Hop Networks," Pervasive and Mobile Computing, vol. 4, No. 3, 2008, pp. 390-420.

(Continued)

*Primary Examiner* — Edward Urban
*Assistant Examiner* — Max Mathew
(74) *Attorney, Agent, or Firm* — Brundidge & Stanger, P.C.

(57) ABSTRACT

Implementations and techniques for model based Doppler compensation using traffic data are generally disclosed.

18 Claims, 7 Drawing Sheets

(56) References Cited

FOREIGN PATENT DOCUMENTS

| JP | 2001-194449 | 7/2001 |
| JP | 2007-267380 | 10/2007 |
| JP | 2010-0537524 A | 12/2010 |
| WO | 2009/076891 A1 | 6/2009 |
| WO | 2009110053 A1 | 9/2009 |

OTHER PUBLICATIONS

Dahlman, E. et al., "Key Features of the LTE Radio Interface," Ericsson Review 2, 2008, pp. 77-80.

Guo, C. et al., "A Seamless and Proactive End-To-End Mobility Solution for Roaming Across Heterogeneous Wireless Networks," IEEE Journal on Selected Areas in Communications, vol. 22, No. 5, 2004, pp. 834-848.

Hara, S. et al., "A Novel OFDM Adaptive Antenna Array for Delayed Signal and Doppler-Shifted Signal Suppression," in Proc. IEEE Int. Conf. Commun., Jun. 2001, vol. 7, pp. 2302-2306.

Lozano, A., "Long-Term Transmit Beamforming for Wireless Multicasting," IEEE International Conference on Acoustics, Speech and Signal Processing, 2007, ICASSP 2007, Apr. 15-20, 2007, pp. III-417-III-420.

Mohanty S. and Akyildiz, I.F "A Cross-Layer (Layer 2+3) Handoff Management Protocol for Next-Generation Wireless Systems," IEEE Transactions on Mobile Computing, vol. 5, No. 10, 2006, pp. 1347-1360.

Parkvall, S. et al., "LTE-Advanced-Evolving LTE Towards IMT-Advanced," in Proceedings of the IEEE Vehicular Technology Conference (VTC'08), 2008, pp. 1-5.

Petermann, M. et al., "Sum-Rate Evaluation of Beamforming with Limited Feedback for the Evolved UTRA Downlink," in Proc. of ITG/IEEE Workshop on Smart Antennas, pp. 1-8.

Tuomaala, E. and Kuusel, M., "Performance of Spatial Multiplexing in High Speed Downlink Packet Access System", ICICS 2006.

Australian Patent Office, International Search Report and Written Opinion of the International Searching Authority for PCT/US10/051182, mailed on Dec. 16, 2010.

Sun, Chen et al., Fast Beamforming of Electronically Steerable Parasitic Array Radiator Antennas: Theory and Experiment, IEEE Transactions on Antennas and Propagation, vol. 52, No. 7, Jul. 2004.

Clerckx, B., et al., "3GPP LTE and LTE-Advanced," EURASIP Journal on Wireless Communications and Networking, vol. 2009, pp. 1-3 (2009).

Office Action issued in corresponding Japanese application No. 2013-531555 on May 20, 2014.

Petermann, M. et al. "Sum-Rate Evaluation of Beamforming with Limited Feedback for the Evolved UTRA downlink," in Proc of ITG/IEEE Workshop on Smart Antennas, pp. 1-8, Feb. 2007.

\* cited by examiner

600 A computer program product.

602 A signal bearing medium.

604 at least one of one or more instructions for determining a first Doppler compensation factor for a first user group in response to traffic data associated with the first user group;

one or more instructions for determining a second Doppler compensation factor for a second user group in response to traffic data associated with the second user group;

one or more instructions for simulating behavior of the first wireless network in response to the traffic information and in response to the simulated behavior of the second wireless network;

one or more instructions for transmitting data from a base station to the first user group at a frequency adjusted by the first Doppler compensation factor;

one or more instructions for transmitting data from the base station to the second user group at a frequency adjusted by the second Doppler compensation factor;

one or more instructions for determining a radial velocity of the first user group in response to the traffic data associated with the first user group;

one or more instructions for determining a radial velocity of the second user group in response to the traffic data associated with the second user group;

one or more instructions for determining an adjustment of the first Doppler compensation factor in response to an expected change in the radial velocity of the first user group; or one or more instructions for determining an adjustment of the second Doppler compensation factor in response to an expected change in the radial velocity of the second user group.

| 606 a computer-readable medium. | 608 a recordable medium. | 610 a communications medium. |

FIG. 6

MODEL BASED DOPPLER COMPENSATION USING TRAFFIC DATA

BACKGROUND

Unless otherwise indicated herein, the approaches described in this section are not prior art to the claims in this application and are not admitted to be prior art by inclusion in this section.

Next generation wireless networks supporting standards such as 3GPP Long Term Evolution (LTE) may be expected to employ beamforming and multicasting techniques. While current beamforming techniques are codebook based, advanced LTE implementations may employ analog beamforming techniques capable of achieving more subtle effects. Ultimately when base stations achieve finer control over arrays of antennas to adjust beam phase and frequency, it may be possible to aim and tune beams in response to real-time environmental changes at increasingly higher levels of granularity. Various environmental factors, such as user motion relative to a base station, may become increasingly important at the higher frequencies used by next generation networks. For example, in an LTE network the motion from an ordinary commute may generate Doppler shifts of sufficient magnitude to affect the coherence time of wireless communication signals.

SUMMARY

In accordance with some implementations, methods for model based Doppler compensation using traffic data may include determining a Doppler compensation factor for a user group based on traffic data for the user group and determining another Doppler compensation factor for another user group based on traffic data associated with the other user group. In some implementations, the traffic data may be real-time traffic data. Real-time traffic data may include data that has been collected within minutes of being used to determine Doppler compensation factors. The respective Doppler compensation factors may then be used to adjust the frequencies used to communicate with the different user groups. In addition, different beam patterns may be employed when transmitting data to the different user groups using the respective adjusted transmission frequencies. In accordance with some implementations, articles including a computer program product are also described where the products store instructions that, if executed, may result in the methods as summarized above.

In accordance with some implementations, systems are described that may include a base station configured to determine Doppler compensation factors for different user groups based on traffic data associated with those user groups. The base station may use the respective Doppler compensation factors to adjust the frequencies used to communicate with the different user groups. In addition, the base station may be configured to use different beam patterns when transmitting data to the different user groups using the respective adjusted transmission frequencies.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 6 is an illustration of an example computer program product; and

DETAILED DESCRIPTION

Figure 1:
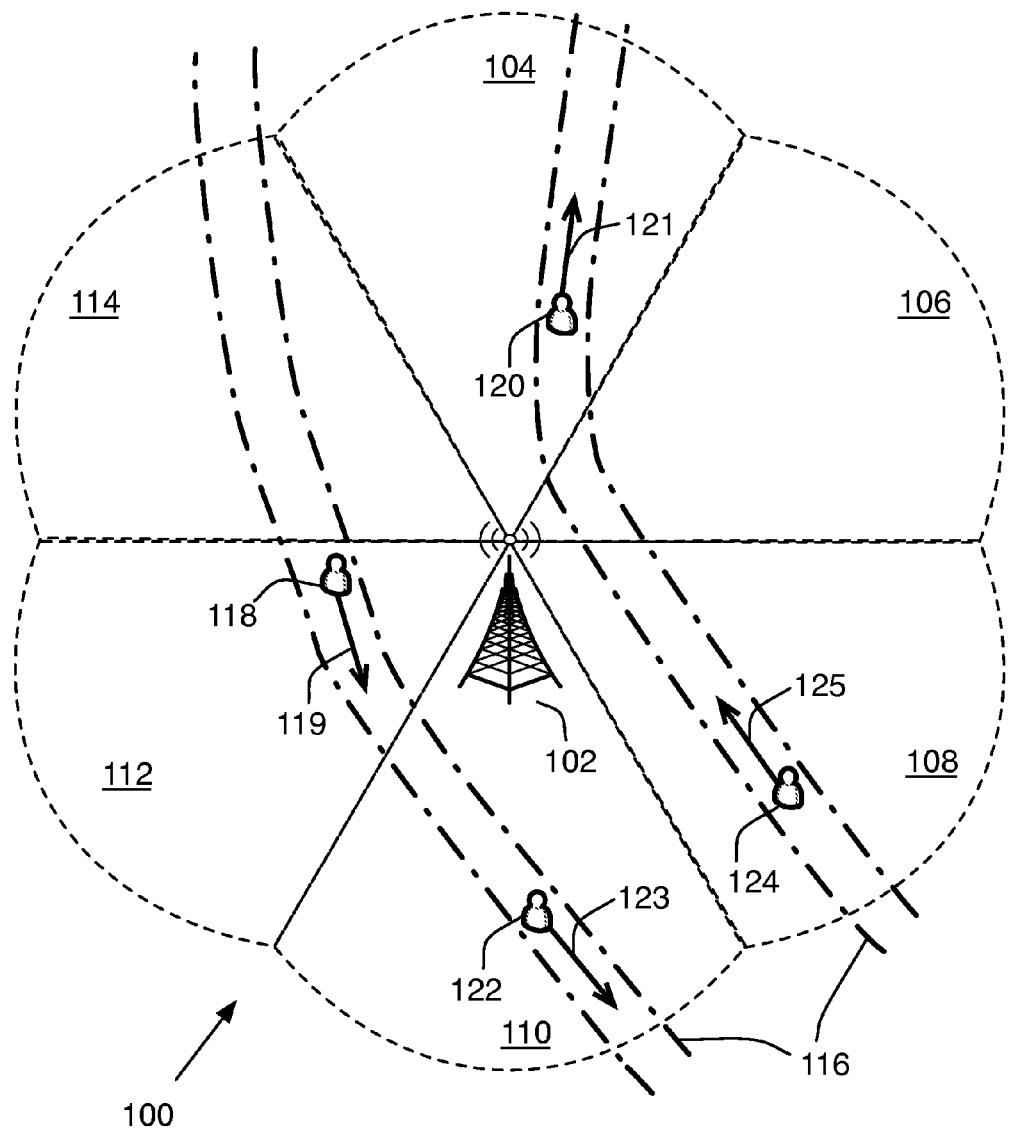
FIGS. 1 and 2 are illustrative diagrams of an example system.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the embodiments of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to wireless networks and more particularly to model based Doppler compensation in wireless networks using traffic data.

In accordance with various implementations of the present disclosure, traffic data obtained from mobile devices and/or other sources may be used to undertake analysis of Doppler effects so that communication frequencies in a mobile system may be tuned to compensate for the Doppler effects. For example, traffic data from a traffic aggregator may be used to determine the velocity of user's cars in different sectors of base station coverage and the frequencies used by the base station to communicate with mobile devices associated with the cars may be tuned appropriately to improve service quality. Additionally, beam placement may be altered to establish groups of users having similar velocities so that Doppler compensation may be applied on a group-by-group basis.

In accordance with various implementations of the present disclosure, a base station may implement a model incorporating information regarding user motions and may select areas or sectors based on potential beam patterns and/or existing beam patterns to group users with similar relative radial velocity components. In various implementations the base station's model may also incorporate information of expected changes in the relative velocities of user groups. In various implementations, information regarding user motions relative to a base station may be gathered from user Global Positioning System (GPS) data, data derived from Doppler analysis, and/or traffic data. For each beam the base station may then determine a frequency compensation factor based on the relative velocity of a user group and may apply that compensation to communications transmitted to and/or received from the group. In this way, Doppler compensations may be determined dynamically and then applied in a sector specific manner to mobile devices on an individual and/or group basis.

FIG. 1 illustrates a cell 100 of a wireless communication network in accordance with at least some embodiments of the present disclosure. In various implementations, cell 100 may facilitate wireless communications in accordance with an advanced standard such as the 3GPP Long Term Evolution (LTE) standard. Cell 100 includes a base station (BS) 102 that provides cellular coverage in distinct sectors 104, 106, 108, 110, 112 and 114 arrayed radially with respect to BS 102. In the example of FIG. 1, a divided roadway 116 at least partially overlapped by cell 100 includes users 118, 120, 122 and 124 located in various positions and orientations along roadway 116. The motion of users 118, 120, 122 and 124 may be indicated by respective instantaneous velocity vectors 119, 121, 123 and 125 describing the user's overall speed or velocity and direction of travel. In the discussion that follows, users 118, 120, 122 and 124 may each bear a mobile device, such as a cell phone, engaged in cellular communications with BS 102. In addition, each of users 118, 120, 122 and 124 may be considered representative of a corresponding group of users having similar velocities and direction of travel.

Figure 2:
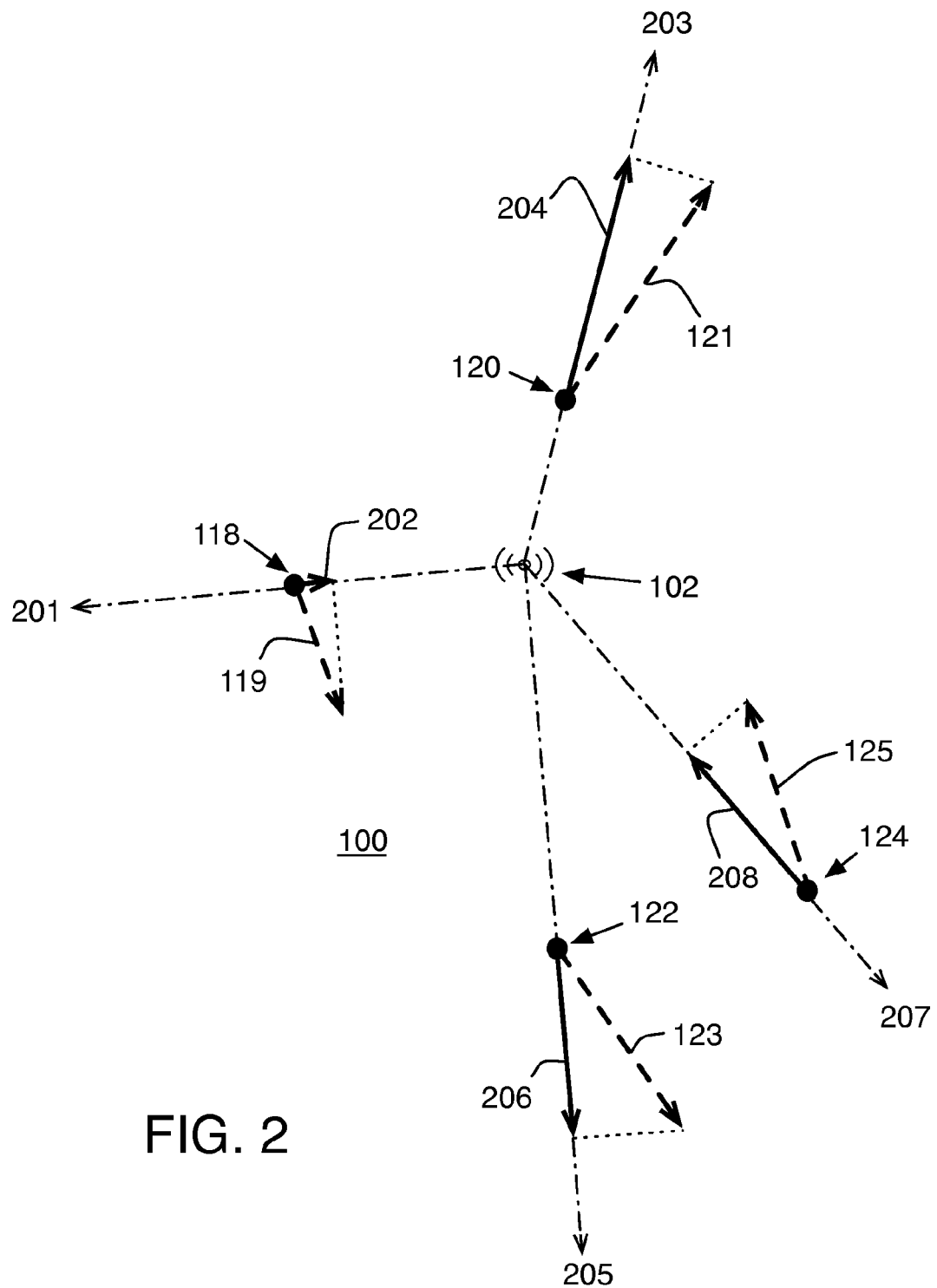

FIG. 2 illustrates various components of FIG. 1 in greater detail in accordance with at least some embodiments of the present disclosure. In FIG. 2 users 118, 120, 122 and 124 are illustrated as being located with respect to BS 102 along respective radial directions 201, 203, 205 and 207. In turn, radial velocities 202, 204, 206 and 208 along respective directions 201, 203, 205 and 207 correspond to the radial components of user velocity vectors 119, 121, 123 and 125 respectively. For example, with respect to BS 102, user 122 has a radial velocity 206 directed away from BS 102 along direction 205 while user 124 has a radial velocity 208 directed towards BS 102 along direction 207.

As user 122 moves away from BS 102, communications between user 122 and BS 102 may be expected to experience a Doppler shift down in frequency in an amount proportional to the relative radial velocity of user 122 with respect to BS 102 which, assuming a fixed location for BS 102, may correspond to the magnitude of radial velocity 206. In contrast, as user 124 moves towards BS 102, communications between user 124 and BS 102 may be expected to experience a Doppler shift up in frequency in an amount proportional to the magnitude of radial velocity 208. By way of comparison, communications between user 118 and BS 102 may be expected to experience a smaller Doppler shift up in frequency than that experienced by communications associated with user 124 because user 118 has a more tangential trajectory with respect to BS 102 and hence a smaller radial velocity 202 directed towards BS 102 than radial velocity 208 of user 124.

Figure 3:
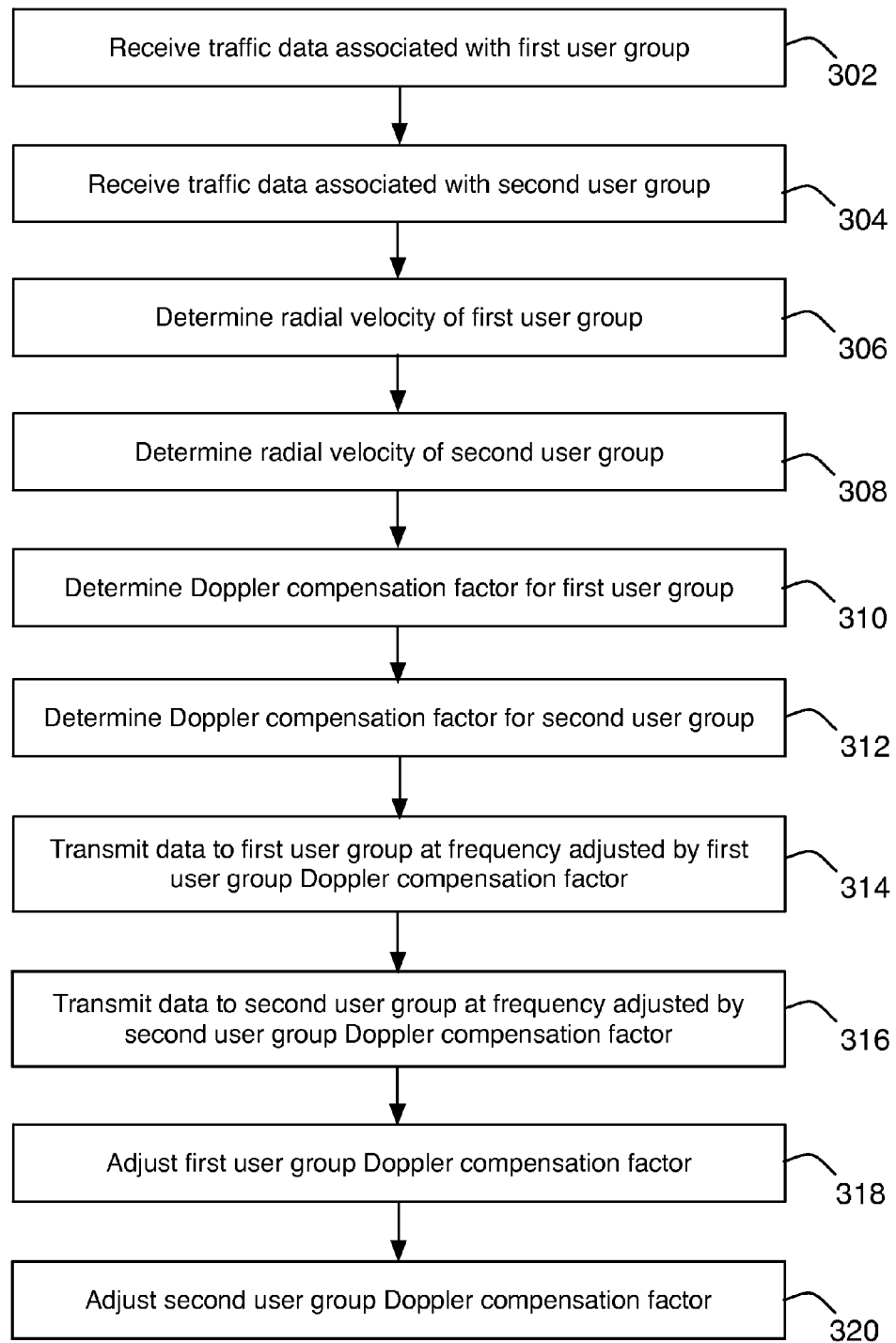
FIG. 3 is an illustration of an example process for model based Doppler compensation using traffic data.

FIG. 3 illustrates a flow diagram of an example process 300 for model based Doppler compensation using traffic data according to various implementations of the present disclosure. Process 300 may include one or more operations, functions or actions as illustrated by one or more of blocks 302, 304, 306, 308, 310, 312, 314, 316, 318 and/or 320. Process 300 may begin at block 302.

At block 302, traffic data associated with a first group of users may be received. For example, block 302 may involve BS 102 receiving traffic data associated with user 120 where that traffic data may be indicative of the radial velocity 204 of user 120. As noted above, user 120 may be representative of a group of users having similar trajectories and radial velocities with respect to BS 102. Similarly, at block 304, traffic data associated with a second group of users may be received. For example, block 304 may involve BS 102 receiving traffic data associated with user 124 where that traffic data may be indicative of the radial velocity 208 of user 124. In various implementations, the traffic data provided at blocks 302 and 304 may be real-time traffic data where real-time traffic data may include traffic data that was collected within minutes of being provided at blocks 302 and 304.

In various implementations, traffic data received in blocks 302 and/or 304 may include positional data, such as a time series of GPS positional data, indicating the location(s) of users at various times with respect to a base station. In some examples traffic data may include data collected from sensors located adjacent roadways (e.g., magnetic loops, traffic cameras, etc.) where that traffic data may be provided by traffic data vendors. Referring to FIG. 2, block 302 may include receiving data associated with user 120 where that data indicates one or more positions of user 120 with respect to BS 102 as a function of time. Similarly, block 304 may include data associated with user 124 where that data indicates positions of user 124 with respect to BS 102 as a function of time.

At block 306, the traffic data associated with the first user group may be used to determine a radial velocity of the first user group with respect to a base station. Similarly, at block 308, the traffic data associated with the second user group may be used to determine a radial velocity of the second user group with respect to the base station. In various implementations, a base station receiving corresponding traffic data in blocks 302 and 304 may employ modeling logic to use that information to determine the radial velocities in respective blocks 306 and 308. For example, referring to FIG. 2, block 306 may include BS 102 using GPS coordinates associated with user 120 to calculate radial velocity 204, while block 308 may include BS 102 using GPS coordinates associated with user 124 to calculate radial velocity 208. For example, referring to FIG. 2, block 306 may include BS 102 using velocity vector 121, derived from, for example, GPS data received in block 302, to determine radial velocity 204 by decomposing velocity vector 121 into radial and transverse velocity components where the magnitude of radial velocity 204 corresponds to the dot product of velocity vector 121 and a unit vector oriented along direction 203.

In various implementations, radial velocities at blocks 306 and/or 308 may be determined in response to user velocity information included in the traffic data received in blocks 302 and/or 304. For example, traffic data received in block 302 may specify the velocity of user 120 with respect to BS 102 while traffic information received in block 304 may specify the velocity of user 124 with respect to BS 102.

Process 300 may continue at block 310 where a Doppler compensation factor may be determined in response to the radial velocity determined at block 306. Similarly, at block 312, a second Doppler compensation factor may be determined in response to the radial velocity determined at block 308. In various implementations, a base station may use modeling logic to determine the Doppler compensations in blocks 310 and 312 using the following approximate Doppler expression:

$$f = (1 - (v_{S,R}/v))f_0 \qquad (\text{Eq. 1})$$

where the quantity f represents the frequency observed at a receiver R, $f_0$ represents the frequency emitted by a source S, the quantity v represents the velocity of waves in the medium of interest (e.g., approximately the speed of light for Radio Frequency (RF) cellular communications) and the quantity $v_{S,R}$ represents the relative velocity between source S and receiver R. The quantity $v_{S,R}$ is positive when the source S and receiver R are moving away from each other and negative when the source S and receiver R are moving towards each other.

For example, referring to FIG. 2, block 310 may include BS 102 using the magnitude of radial velocity 204 and the orientation of vector 121 with respect to BS 102 to determine the quantity $v_{S,R}$. BS 102 may then use Eq. 1 to calculate the frequency f for user 120 using the $v_{S,R}$ value. For instance, for user 120, the magnitude of $v_{S,R}$ may be proportional to the magnitude of radial velocity 204 and have a positive value given the orientation of vector 121 away from BS 102. Thus, in this example, a calculation undertaken using Eq. 1 would yield a value for f that is less than the emitted frequency $f_0$. The Doppler compensation factor determined in block 310 may then be obtained as a positive quantity from the difference between the values of f and $f_0$.

Similarly, in various examples, block 312 may include BS 102 using the magnitude of radial velocity 208 and the orientation of vector 125 with respect to BS 102 to determine the quantity $v_{S,R}$ for user 124 and subsequently the frequency f for user 124 using Eq. 1. In this example the magnitude of $v_{S,R}$ may be proportional to the magnitude of radial velocity 208 and have a negative value given the orientation of vector 125 towards BS 102. Thus, in this example, a calculation undertaken using Eq. 1 would yield a value for f that is greater than the emitted frequency $f_0$. The Doppler compensation factor determined in block 312 may then be obtained as a negative quantity from the difference between the values of f and $f_0$.

In various implementations, rather than utilizing radial velocities determined at blocks 306 and/or 308, Doppler compensation factors may be determined in blocks 310 and/or 312 in response to communications received from users and/or groups of users. For instance, user 120 may transmit a communication (e.g., a cellular communication) to BS 102 at an emitted or expected frequency $f_0$. In turn, because of the relative motion of user 120 with respect to BS 102, BS 102 may receive that communication at a Doppler shifted or observed frequency f. The BS 102, having knowledge of the expected frequency $f_0$, may then undertake block 310 by first using known signal processing techniques to extract the observed frequency f from user 120's communication and subsequently determining the difference between the observed frequency f and the expected frequency $f_0$ to obtain the corresponding Doppler compensation factor.

Process 300 may continue at block 314 with the transmission of data to the first user or user group at a frequency that is adjusted by the Doppler compensation factor determined in block 310. Likewise, at block 316, data may be transmitted to the second user or user group at a frequency that is adjusted by the Doppler compensation factor determined in block 312. In various implementations, a base station may undertake blocks 314 and 316 by adjusting the frequency used to transmit cellular communications data to the users according to the respective Doppler compensations determined in blocks 310 and 312.

For example, referring again to FIG. 2, BS 102 may undertake block 314 by increasing the frequency used to communicate with user 120 by an amount corresponding to the Doppler compensation factor determined at block 310. By doing so, BS 102 may substantially compensate for the decrease in frequency caused by the relative motion of user 120 away from BS 102. Likewise, in implementing block 316, BS 102 may decrease the frequency used to communicate with user 124 by an amount corresponding to the Doppler compensation factor determined at block 312, thereby substantially compensating for the increase in frequency caused by the relative motion of user 124 toward BS 102.

In various implementations, transmitting data at blocks 314 and 316 may include transmitting data at block 314 over a communication channel at a one channel frequency and transmitting data at block 316 over another communication channel at a different channel frequency. For instance, in some examples, where different user groups having different Doppler compensation factors may be located in a single sector, blocks 314 and 316 may involve transmitting data to the different user groups using a similar beam pattern but employing different channels to provide the Doppler compensated communications.

In various implementations, the adjusted transmissions of blocks 314 and/or 316 may also include the application of correspondingly different beam patterns to the corresponding communications. For example, in undertaking block 314, a base station may use, for example, one or more multiple element antenna arrays in combination with known digital beam patterning techniques to physically direct the RF beam carrying communications data to a particular user and/or group of users. For example, referring to both FIGS. 1 and 2, in implementing block 314, BS 102 may use beam patterning techniques to spatially direct transmission to user 120 and/or the group of users represented by user 120 in sector 104 while spatially minimizing the transmission to exclude other users and/or groups of users and/or sectors. Likewise, in implementing block 316, BS 102 may use beam patterning techniques to spatially direct the transmission to user 124 and/or the group of users represented by user 124 in sector 108 while minimizing the transmission to exclude other users and/or groups of users and/or sectors.

In various implementations, user groups may be selected or defined based at least in part on static or fixed sectors. For example, in FIG. 1 a group including user 120 may be defined based on the presence of user 120 within sector 104 while a group including user 124 may be defined based on the presence of user 124 within sector 108. In various implementations, user groups may be dynamically defined based at least in part on a largest spatial area with a smallest variance of user velocities determined from an average of velocities across an area. For example, in cellular communication systems employing variable sector shapes user groups may be defined to include users exhibiting variances in relative velocities that fall below a particular threshold.

In various implementations, process 300 may continue at blocks 318 and 320 with determining an adjustment of the first Doppler compensation factor in response to expected changes in radial velocity of the first user group and an adjustment of the second Doppler compensation factor in response to expected changes in radial velocity of the second user group respectively. For example, referring to FIG. 1, modeling logic in BS 102 may be used to determine a change in radial velocity of user 124 that may be expected as user 124 follows an expected travel path (e.g., roadway 116). The modeling logic may be provided with predetermined travel path information for the area covered by BS 102 to enable BS 102 to undertake blocks 318 and/or 320.

Thus, for instance, the radial velocity of user 124 with respect to BS 102 may be expected to diminish in magnitude as user 124 travels roadway 116 towards BS 102 and into sector 106. Moreover, as user 124 traverses from sector 108, through sector 106 and into sector 104, the radial velocity of user 124 may be expected to not only increase again but also to assume a different orientation with respect to BS 102. Hence, the Doppler compensation factor determined for user 124 at block 312 when user 124 is located in sector 108 and moving toward BS 102, may be adjusted at block 318 to account for the relative motion of user 124 away from BS 102 when traversing sector 104. In other words, while a negative valued Doppler compensation factor may be determined when user 124 is in sector 108, the Doppler compensation factor may be adjusted such that it has a positive value when user 124 is in sector 104.

While the implementation of example process 300, as illustrated in FIG. 3, may include the undertaking of all of blocks 302, 304, 306, 308, 310, 312, 314, 316, 318 and 320, claimed subject matter is not limited in this regard and, in various implementations, implementation of process 300 may include the undertaking only a subset of blocks 302, 304, 306, 308, 310, 312, 314, 316, 318 and/or 320.

Further, while FIG. 1 illustrates six sectors in cell 100, in various examples cell 100 may include larger numbers of sectors in accordance with various implementations of the present disclosure. For example, in various implementations, a cell may have thirty-two or more sectors arrayed about a base station where the sectors may range in depth from about three hundred meters up to about ten kilometers.

In addition, not all users or user groups may have Doppler compensation factors determined and/or applied to communications between the users and a base station. Thus, for example, users having small radial velocities, such as user 118 of FIGS. 1 and 2, may not have corresponding Doppler compensation factors determined and/or applied. Moreover, while the description provided herein describes the application of Doppler compensation factors to adjust communications transmitted from a base station to users, the Doppler compensation factors described herein may also be applied to adjust communications received from users at a base station.

Figure 4:
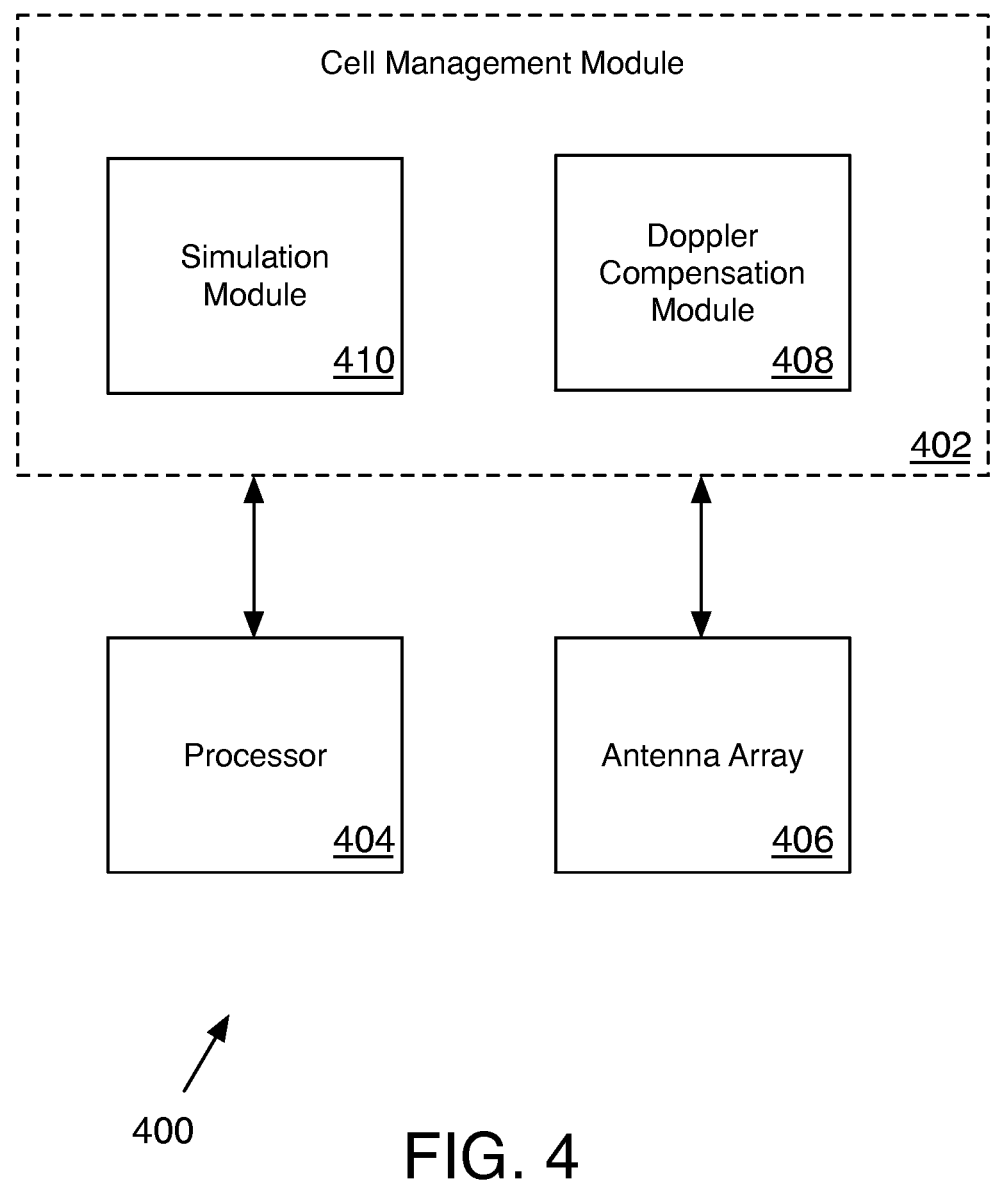
FIG. 4 is an illustrative diagram of another example system.

FIG. 4 illustrates an example wireless communication system 400 in accordance with the present disclosure. System 400 may be used to perform some or all of the various functions discussed above in connection with FIG. 3. System 400 may include any device or collection of devices capable of undertaking model based Doppler compensation using traffic data in accordance with the present disclosure. For example, system 400 may include selected components of a cellular base station, such as BS 102 of FIG. 1, a mobile platform such as a mobile computer, a wireless node, a sensor node of a sensor network, etc., although the present disclosure is not limited in this regard.

System 400 may include a cell management module (CMM) 402 operably coupled to a processor 404 and an antenna array 406. CMM 402 may include a Doppler compensation module 408 and a simulation module 410 that may be configured to undertake, in conjunction with processor 404 and/or array 406, any of the blocks described above with respect to FIG. 3 and process 300. Processor 404 may be a microprocessor or Central Processing Unit (CPU). In other implementations, processor 404 may be an Application Specific Integrated Circuit (ASIC), a Field Programmable Gate Array (FPGA), a digital signal processor (DSP), or other integrated formats.

Processor 404 and module 402 may be configured to communicate by any suitable means, such as, for example, by wired connections or wireless connections. Antenna array 406 may be any antenna array suitable for providing beam forming or beam patterning in accordance with some implementations of the present disclosure. For example, array 406 may be a beam forming antenna array employing electronically steerable parasitic array elements. In various implementations, system 400 may be implemented in a cellular base station such as example BS 102 of FIGS. 1 and 2. System 400 may include additional components and/or devices such as transceiver logic, network interface logic, etc. that have not been depicted in FIG. 4 in the interests of clarity.

In various implementations, specific components of system 400 may undertake one or more of the blocks of process 300. For example, simulation module 410 may undertake blocks 306, 308, 310, 312, 318 and/or 320 in conjunction with processor 404, while compensation module 408 may undertake blocks 314 and/or 316 in conjunction with antenna array 406. Thus, for example, simulation module 410 may utilize traffic data to determine radial velocities for users in blocks 306 and 308 and, subsequently, to determine corresponding Doppler compensation factors for those users in blocks 310 and 312. In addition, simulation module 410 may also undertake adjustment of the Doppler compensation factors in blocks 318 and 320. Compensation module 408 may then employ those Doppler compensation factors (adjusted or otherwise) to tune transmission frequencies to be employed in conjunction with array 406 in transmitting cellular communications to the users at blocks 314 and 316.

Figure 5:
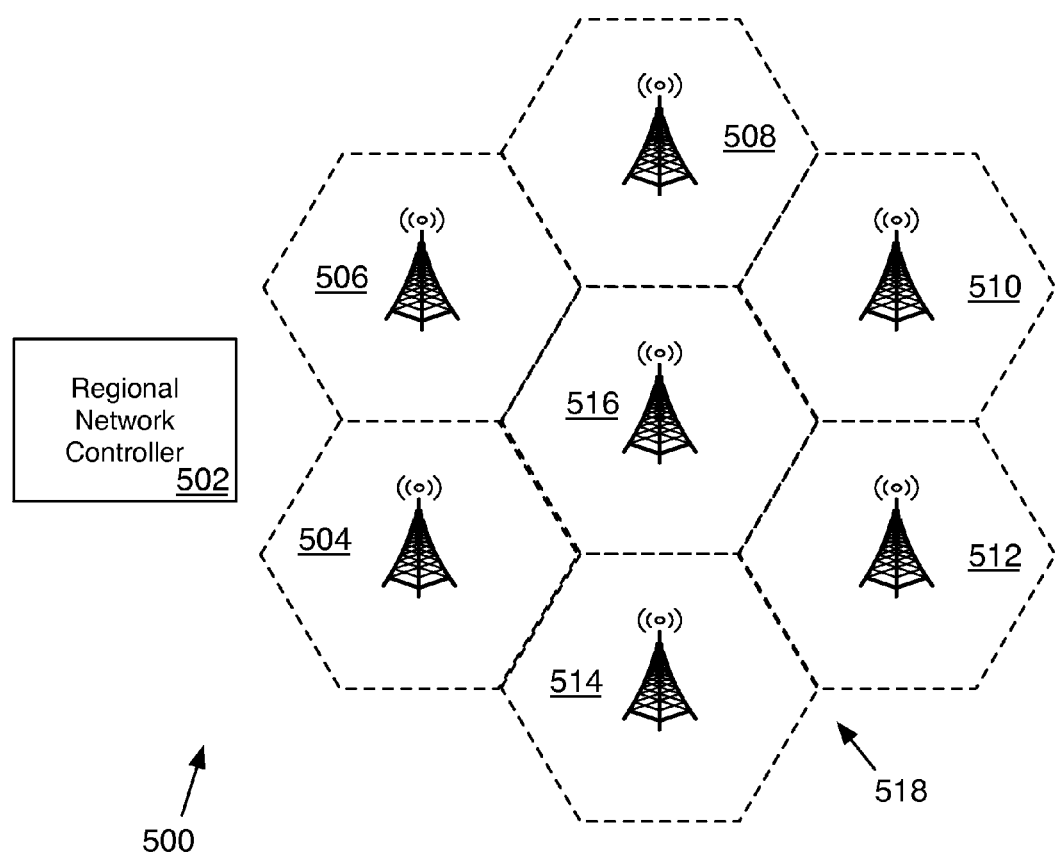
FIG. 5 is an illustrative diagram of another example system.

FIG. 5 illustrates components of another example system 500 for undertaking model based Doppler compensation using traffic data in accordance with at least some implementations of the present disclosure. System 500 may include a regional network controller (RNC) 502 communicatively and/or operably coupled to multiple cellular base stations 504, 506, 508, 510, 512, 514 and 516 forming a radio network subsystem (RNS) 518. RNC 502 may include hardware, software or firmware logic and/or any combination thereof configured to implement any of the blocks described above with respect to FIG. 3 and process 300. For example, RNC 502 may include a Doppler compensation module and/or a simulation module similar to those described above with respect to system 400 of FIG. 4.

In various implementations, RNC 502 may be configured to dynamically determine Doppler compensation factors specific to various user groups interacting with different base stations of RNS 518 and to provide those Doppler compensation factors, or convey information indicative of frequency adjustments corresponding to those Doppler compensation factors, to base stations 504, 506, 508, 510, 512, 514 and 516. The base stations within RNS 518 may then use the information provided by RNC 502 to adjust transmission frequencies in order to compensate for the relative motion of users within RNS 518.

FIG. 6 illustrates an example computer program product 600 arranged in accordance with at least some examples of the present disclosure. Program product 600 may include a signal bearing medium 602. Signal bearing medium 602 may include one or more instructions 604 that, when executed by, for example, a processor, may provide the functionality described above with respect to FIG. 3. Thus, for example, referring to the system of FIG. 4, module 402 may undertake one or more of the blocks shown in FIG. 3 in response to instructions 604 conveyed by medium 602.

In some implementations, signal bearing medium 602 may encompass a computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, referring to the system of FIG. 4, program product 600 may be wirelessly conveyed to module 402 by signal bearing medium 602, where signal bearing medium 602 is conveyed to NMM 104 by a wireless communications medium 610 (e.g., an wireless communications medium conforming with the 802.11 standard).

Figure 7:
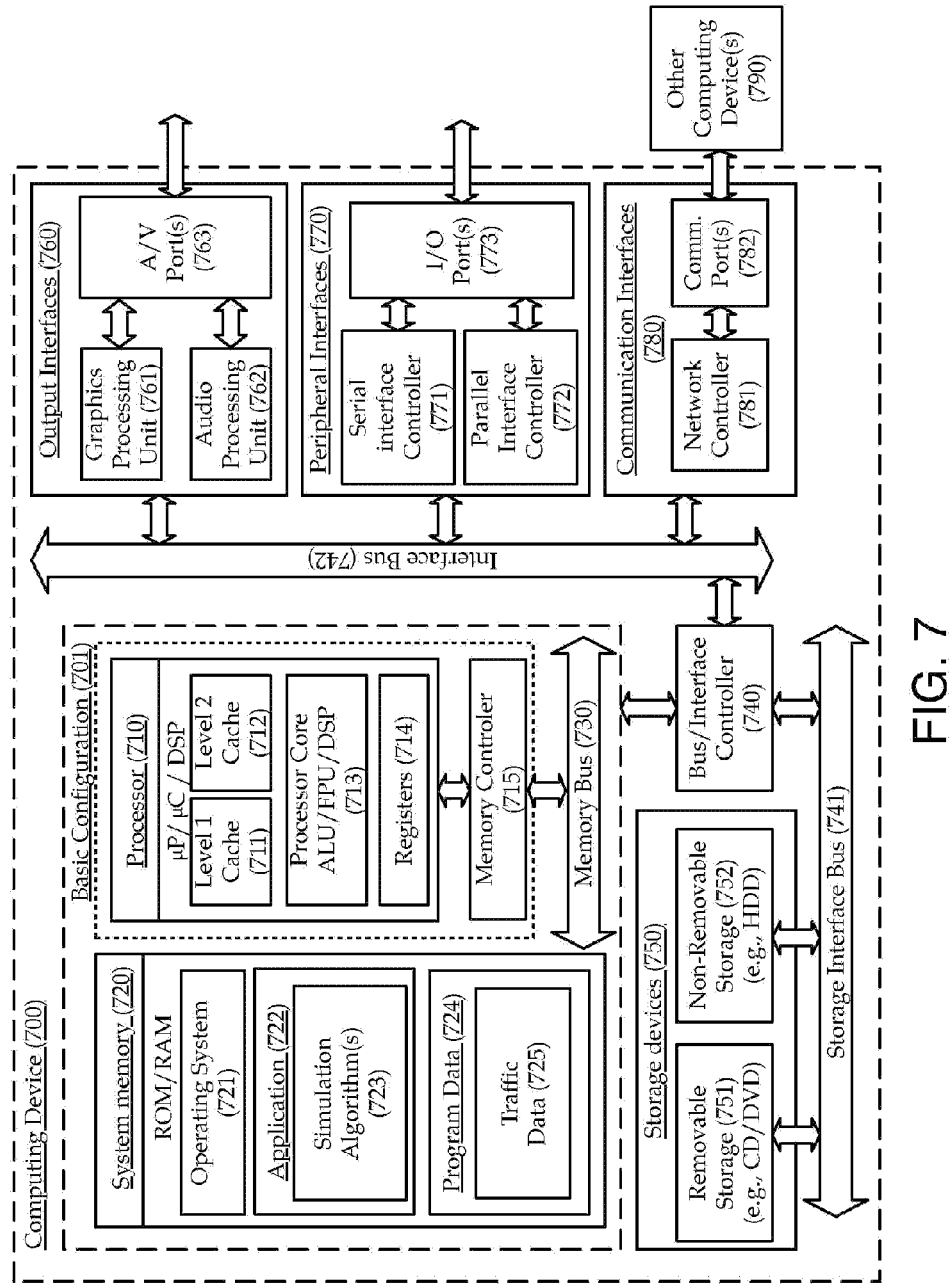
FIG. 7 is an illustration of an example computing device, all arranged in accordance with at least some embodiments of the present disclosure.

FIG. 7 is a block diagram illustrating an example computing device 700. In some examples, computing device 700 may undertake model based Doppler compensation using traffic data in accordance with at least some implementations of the present disclosure. In a very basic configuration 701, computing device 700 typically includes one or more processors 710 and system memory 720. A memory bus 730 can be used for communicating between the processor 710 and the system memory 720.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 may include instructions such as one or more simulation algorithms 723 that are arranged to perform the functions as described herein including the actions described with respect to the flow chart shown in FIG. 3. Program Data 724 may include traffic data 725 that may be useful for implementing instructions 723. In some examples, application 722 can be arranged to operate with program data 724 on an operating system 721 such that implementations of model based Doppler compensation using traffic data, as described herein, may be provided. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output interfaces 760 include a graphics processing unit 761 and an audio processing unit 762, which can be configured to communicate to various external devices such as a display or speakers via one or more A/V ports 763. Example peripheral interfaces 770 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which can be arranged to facilitate communications with one or more other computing devices 790 over a network communication via one or more communication ports 782. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations or implemented in a workstation or a server configuration.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include an global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for providing Doppler compensation in a wireless network, comprising:
   determining a first Doppler compensation factor for a first user group in response to traffic data associated with the first user group, the traffic data associated with the first user group comprising first data collected from sensors located adjacent to a roadway;
   determining a second Doppler compensation factor for a second user group in response to traffic data associated with the second user group, the traffic data associated with the second user group comprising second data collected from sensors located adjacent to the roadway;
   transmitting data from a base station to the first user group at a frequency adjusted by the first Doppler compensation factor;
   transmitting data from the base station to the second user group at a frequency adjusted by the second Doppler compensation factor; and
   determining at least an adjustment of the first Doppler compensation factor in response to an expected change in a radial velocity of the first user group or an adjustment of the second Doppler compensation factor in response to an expected change in a radial velocity of the second user group,
   wherein the traffic data associated with the first user group includes data indicative of the expected change in the radial velocity of the first user group, and wherein the traffic data associated with the second user group includes data indicative of the expected change in the radial velocity of the second user group.

2. The method of claim 1, wherein the transmitting data from the base station to the first user group includes applying a first beam pattern, wherein the transmitting data from the base station to the second user group includes applying a second beam pattern, and wherein the first beam pattern is different than the second beam pattern.

3. The method of claim 1, wherein the transmitting data from the base station to the first user group comprises transmitting data from the base station to the first user group over a first channel at a first frequency, wherein the transmitting data from the base station to the second user group comprises transmitting data from the base station to the second user group over a second channel at a second frequency different than the first frequency.

4. The method of claim 1, wherein the determining the first Doppler compensation factor includes determining the radial velocity of the first user group in response to the traffic data associated with the first user group, and wherein the determining the second Doppler compensation factor includes determining the radial velocity of the second user group in response to the traffic data associated with the second user group.

5. The method of claim 1, wherein the data indicative of the expected change in the radial velocity of the first user group includes an expected travel path of the first user group, and wherein the data indicative of the expected change in the radial velocity of the second user group includes an expected travel path of the second user group.

6. The method of claim 4, wherein the traffic data associated with the first user group includes velocity data associated with the first user group, and wherein the traffic data associated with the second user group includes velocity data associated with the second user group.

7. The method of claim 1, wherein the determining the first Doppler compensation factor for the first user group in response to traffic data associated with the first user group comprises comparing a first observed frequency to an expected frequency, and wherein the determining the second Doppler compensation factor for the second user group in response to traffic data associated with the second user group comprises comparing a second observed frequency to the expected frequency.

8. An article comprising a non-transitory computer-program product having stored therein instructions that, if executed, result in:
   determining a first Doppler compensation factor for a first user group in response to traffic data associated with the first user group, the traffic data associated with the first user group comprising data collected from sensors located adjacent to a roadway;
   determining a second Doppler compensation factor for a second user group in response to traffic data associated with the second user group, the traffic data associated with the second user group comprising data collected from sensors located adjacent to the roadway;
   transmitting data from a base station to the first user group at a frequency adjusted by the first Doppler compensation factor;
   transmitting data from the base station to the second user group at a frequency adjusted by the second Doppler compensation factor; and
   determining at least an adjustment of the first Doppler compensation factor in response to an expected change in a radial velocity of the first user group or an adjustment of the second Doppler compensation factor in response to an expected change in a radial velocity of the second user group~
   wherein the traffic data associated with the first user group includes data indicative of the expected change in the radial velocity of the first user group, and wherein the traffic data associated with the second user group includes data indicative of the expected change in the radial velocity of the second user group.

9. The article of claim 8, wherein the transmitting data from the base station to the first user group includes applying a first beam pattern, wherein the transmitting data from the base station to the second user group includes applying a second beam pattern, and wherein the first beam pattern is different than the second beam pattern.

10. The article of claim 8, wherein the determining the first Doppler compensation factor includes determining the radial velocity of the first user group in response to the traffic data associated with the first user group, and wherein the determining the second Doppler compensation factor includes determining the radial velocity of the second user group in response to the traffic data associated with the second user group.

11. The article of claim 8, wherein the data indicative of the expected change in the radial velocity of the first user group includes an expected travel path of the first user group, and wherein the data indicative of the expected change in the radial velocity of the second user group includes an expected travel path of the second user group.

12. The article of claim 8, wherein the determining the first Doppler compensation factor for the first user group in response to traffic data associated with the first user group comprises comparing a first observed frequency to an expected frequency, and wherein the determining the second Doppler compensation factor for the second user group in response to traffic data associated with the second user group comprises comparing a second observed frequency to the expected frequency.

13. A system, comprising:
   a base station configured to:
      determine a first Doppler compensation factor for a first user group in response to traffic data associated with the first user group, the traffic data associated with the first user group comprising data collected from sensors located adjacent to a roadway and data associated with expected changes in radial velocity of the first user group following a first expected travel path;
      determine a second Doppler compensation factor for a second user group in response to traffic data associated with the second user group, the traffic data associated with the second user group comprising data collected from sensors located adjacent to the roadway and data associated with expected changes in radial velocity of the second user group following a second expected travel path;
      transmit data from a base station to the first user group at a frequency adjusted by the first Doppler compensation factor; and
      transmit data from the base station to the second user group at a frequency adjusted by the second Doppler compensation factor.

14. The system of claim 13, wherein the base station is configured to transmit data to the first user group by applying a first beam pattern, wherein the base station is configured to transmit data to the second user group by applying a second beam pattern, and wherein the first beam pattern is different than the second beam pattern.

15. The system of claim 13, wherein the base station is configured to determine the first Doppler compensation factor by determining a radial velocity of the first user group in response to the traffic data associated with the first user group, and wherein the base station is configured to determine the second Doppler compensation factor by determining a radial velocity of the second user group in response to the traffic data associated with the second user group.

16. The system of claim 15, wherein the base station is further configured to:
   determine an adjustment of the first Doppler compensation factor in response to an expected change in the radial velocity of the first user group; and
   determine an adjustment of the second Doppler compensation factor in response to an expected change in the radial velocity of the second user group.

17. The method of claim 1, wherein the first data includes the radial velocity of the first user group data collected from the sensors located adjacent to the roadway, and the second data includes the radial velocity of the second user group collected from the sensors located adjacent to the roadway.

18. The system of claim 13, wherein the determining the first Doppler compensation factor for the first user group in response to traffic data associated with the first user group comprises comparing a first observed frequency to an expected frequency, and wherein the determining the second Doppler compensation factor for the second user group in response to traffic data associated with the second user group comprises comparing a second observed frequency to the expected frequency.

* * * * *

UNITED STATES PATENT AND TRADEMARK OFFICE
CERTIFICATE OF CORRECTION

| | | |
|---|---|---|
| PATENT NO. | : 8,954,103 B2 | Page 1 of 1 |
| APPLICATION NO. | : 13/059744 | |
| DATED | : February 10, 2015 | |
| INVENTOR(S) | : Kruglick | |

It is certified that error appears in the above-identified patent and that said Letters Patent is hereby corrected as shown below:

In the Drawings:

In Fig. 7, Sheet 7 of 7, in Box "(715)", in Line 1, delete "Memory Controler" and insert -- Memory Controller --, therefor.

In the Specification:

In Column 1, below Title, insert -- CROSS-REFERENCE TO RELATED APPLICATIONS
The present application is a U.S. national stage filing under 35 U.S.C. §371 of International Application No. PCT/US2010/051182, filed on Oct. 1, 2010. --.

In Column 11, Line 52, delete "and or" and insert -- and/or --, therefor.

In Column 13, Line 43, delete "an global" and insert -- a global --, therefor.

In the Claims:

In Column 15, Line 31, in Claim 8, delete "group~" and insert -- group, --, therefor.

Signed and Sealed this
Seventh Day of July, 2015

Michelle K. Lee
*Director of the United States Patent and Trademark Office*